(12) United States Patent
Edelmann et al.

(10) Patent No.: US 6,699,586 B2
(45) Date of Patent: Mar. 2, 2004

(54) ORGANOSILICON NANO/MICROHYBRID OR MICROHYBRID SYSTEM COMPOSITION FOR SCRATCH AND ABRASION RESISTANT COATINGS

(75) Inventors: Roland Edelmann, Wehr (DE); Jaroslaw Monkiewicz, Rheinfelden (DE); Reiner Mehnert, Markkleeberg (DE); Hans-Jürgen Gläsel, Leipzig (DE); Helmut Langguth, Leipzig (DE)

(73) Assignee: Degussa AG, Duesseldorf (DE)

(*) Notice: Subject to any disclaimer, the term of this patent is extended or adjusted under 35 U.S.C. 154(b) by 8 days.

(21) Appl. No.: 10/108,453

(22) Filed: Mar. 29, 2002

(65) Prior Publication Data

US 2002/0197475 A1 Dec. 26, 2002

(30) Foreign Application Priority Data

Mar. 30, 2001 (DE) .......................... 101 16 201
Aug. 25, 2001 (DE) .......................... 101 41 690

(51) Int. Cl.$^7$ .......................... B32B 27/20; B32B 27/30; B32B 27/36; B32B 27/38; B32B 27/40
(52) U.S. Cl. .................. 428/447; 428/402; 428/402.24; 428/403; 428/404; 428/405; 428/407; 428/409; 428/448; 428/413; 428/423.1; 428/480; 428/523; 523/205; 523/206; 523/209; 523/223; 523/400; 524/500; 524/502; 524/506; 524/507; 524/863; 427/212; 427/215; 427/387
(58) Field of Search .................. 428/357, 375, 428/391, 402, 402.24, 403–405, 407, 409, 413, 423.1, 447–448, 480, 523; 427/212, 215, 387, 457; 523/205, 206, 209, 210, 223, 400; 524/500, 502, 506, 507, 863; 528/10, 12, 25, 33, 34

(56) References Cited

U.S. PATENT DOCUMENTS 3,464,950 A 9/1969 Wegehaupt et al.
2002/0094439 A1 * 7/2002 Edelmann et al. .......... 428/404

FOREIGN PATENT DOCUMENTS

| DE | 198 46 659 | 4/2000 |
|---|---|---|
| DE | 198 46 660 | 4/2000 |
| EP | 0 075 697 | 4/1983 |
| EP | 0 518 057 | 12/1992 |
| EP | 0 590 270 | 4/1994 |
| EP | 0 659 786 | 6/1995 |
| EP | 0 716 127 | 6/1996 |
| EP | 0 716 128 | 6/1996 |
| EP | 0 760 372 | 3/1997 |
| EP | 0 814 110 | 12/1997 |
| EP | 0 832 911 | 4/1998 |
| EP | 0 846 715 | 6/1998 |
| EP | 0 846 716 | 6/1998 |
| EP | 0 846 717 | 6/1998 |
| EP | 0 930 342 | 7/1999 |
| EP | 0 953 591 | 11/1999 |
| EP | 0 955 344 | 11/1999 |
| EP | 0 960 921 | 12/1999 |
| EP | 0 978 525 | 2/2000 |
| EP | 0 997 469 | 5/2000 |
| EP | 1 031 593 | 8/2000 |
| EP | 1 195 417 | 1/2001 |
| EP | 1 101 787 | 5/2001 |
| EP | 1 111 002 | 6/2001 |
| EP | 1 195 416 | 4/2002 |
| WO | WO 98/51747 | 11/1998 |

\* cited by examiner

*Primary Examiner*—Robert Dawson
*Assistant Examiner*—Michael J. Feely
(74) *Attorney, Agent, or Firm*—Oblon, Spivak, McClelland, Maier & Neustadt, P.C.

(57) ABSTRACT

Organosilicon nano/microhybrid systems or microhybrid systems having nanoscale and/or microscale oxide particles (KA—O), and an organosilicon shell with at least one organosilicon constituent of the general formula Ia

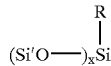

(Ia)

wherein the organosilicon constituent of the shell B is attached to the oxide particles via one or more covalent linkages of formula Ib

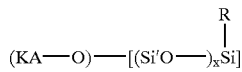

(Ib)

A process for preparing a composition comprising organosilicon nano/microhybrid systems or microhybrid systems directly in a synthetic resin composition allows in situ preparation of a curable resin. The compositions may be used as coating materials for producing scratch resistant and abrasion resistant coatings.

31 Claims, No Drawings

US 6,699,586 B2

ORGANOSILICON NANO/MICROHYBRID OR MICROHYBRID SYSTEM COMPOSITION FOR SCRATCH AND ABRASION RESISTANT COATINGS

BACKGROUND OF THE INVENTION

1. Field of the Invention

The present invention relates to a composition comprising organosilicon nanohybrid and/or microhybrid capsules for scratch and abrasion resistant coatings. The present invention further relates to the use of such compositions as coating materials for producing a scratch and abrasion resistant coatings on substrates and particles.

2. Discussion of the Background

It is known that the surface properties of sol or gel particles of metal or of semi-metal oxides can be modified by treatment with a hydrolyzable organosilane or organosiloxane, where generally only a single silane layer attaches to the oxide or sol gel particle. Oxides and sol or gel particles thus treated, such as inorganic pigments or fillers, can be introduced into a polymer matrix, particularly into films and also into coating compositions and coatings which can be produced from them. In general, however, the scratch and abrasion resistance of such polymer systems is poor.

DE 198 46 660 discloses nanoscale, surface-modified oxide and mixed oxide particles which are enveloped by organosilicon groups bonded covalently to the oxide particle, the organofunctional groups being described as reactive groups and usually having an outward orientation, so that they are incorporated into the polymer matrix by polymerization with the polymer material when the prepolymer cures. The process for preparing such coating compositions is cumbersome, since the organosilane and the oxide component are incorporated into the prepolymer in alternation.

DE 198 46 659 dates from the same time as DE 198 46 660 and relates to a layer material provided with a scratch resistant synthetic resin layer which likewise comprises nanoscale, surface-modified oxide particles.

DE 198 46 659 teaches specifically the use of acryloyloxyalkylsilanes for producing a shell around nanoscale oxide particles, which possesses reactive, radiation-crosslinkable groups. Here again, the coating material is prepared by a time-consuming reaction of a nanoscale silica with 3-methacryloyloxypropyltrimethoxysilane (DYNASYLAN® MEMO) in an acrylate formulation in the presence of water, an acid, and a wetting agent. Again, the components have to be combined in alternation in a specific sequence.

In many cases, said coating materials are of high viscosity and usually contain only a small fraction of oxide particles, which affects the scratch resistance of the subsequent coating. It is also difficult to apply such high viscosity coating materials to a substrate, especially when the substrate in question is thin and liable to tear. The scratch and abrasion resistance of coatings obtainable in this way is often in need of improvement. With such high-viscosity systems furthermore, a special and complex application device is required. In many cases, as well, solvents are added to such high-viscosity coating materials, and lead to an increase in the organic emissions (VOC problems; VOC=volatile organic compounds).

Coatings which are substantially scratch resistant (DIN 53799) can be produced in accordance with the teaching of the as yet unpublished German patent applications 101 00 631.4 and 101 00 633.0. Unfortunately, such coating systems cannot be used for applications where there is a requirement not only for scratch resistance but also for good abrasion resistance (haze to DIN 52 347/ASTM D-1044 and abrasion to DIN 68 861), such as for wood coatings, polymer flooring and wood block flooring.

A commercially customary abrasion resistant PU (polyurethane) varnish gives 2 mg of abraded material after 50 turns (Taber Abraser test to DIN 68 861).

SUMMARY OF THE INVENTION

The object was therefore to provide a possibility for maximizing the scratch and abrasion resistance properties of resin-based coatings. This object is achieved in accordance with the invention as specified in the claims.

Systems have been found based on organosilicon microhybrid capsules (also referred to below as microhybrid systems) or organosilicon nanohybrid and microhybrid capsules together, present another (also referred to below as organosilicon nano/microhybrid systems) composed of oxide particles (KA—O) comprising (a) a nanoscale oxide and/or mixed oxide as nanoscale cores and/or (b) a micro scale synthetic corundum, especially PLAKOR® 13 (ESK-SIC GmbH, average particle diameter 13 μm), as micro scale cores and, in each case, an organosilicon or polymerizable organosilicon shell B, said organosilicon shell B comprising at least one organosilicon constituent of the general formula Ia

$$(Si'O—)_xSi—R \qquad (Ia)$$

in which the groups R are identical or different and R is an organofunctional group, such as alkyl, e.g. methyl, propyl, butyl, octyl, perfluoroalkyl, tridecafluoro-1,1,2,2-tetrahydrooctyl, or alkenyl, such as vinyl or allyl, or aryl, such as phenyl or benzyl, or aminoalkyl, such as 3-aminopropyl, N-(2-aminoethyl)-3-amino propyl, N'-(2-aminoethyl)-N-(2-aminoethyl)-3-aminopropyl, glycidyloxyalkyl, such as 3-glycidyloxypropyl, or methacryloyloxyalkyl, such as 3-methacryloyloxypropyl, to give but a few examples, and x is a number from 0 to 20, the remaining free valences of Si being satisfied by SiO— and/or —Z and the free valences Si' being satisfied by SiO—, —R and/or —Z, the groups Z are identical or different and are hydroxyl and/or alkoxy radicals, such as methoxy, ethoxy, propoxy or butoxy, and each Si and Si' of the shell B carries not more than one group R, and/or the organosilicon constituent of the shell B being attached via one or more covalent linkages of the general formula Ib

$$(KA—O)—[(Si'O—)_xSi—R] \qquad (Ib)$$

in which the groups R are identical or different and R is as defined above and x is a number from 1 to 20, the remaining free valences of Si being satisfied by (KA—O)—, SiO— and/or —Z and the free valences of Si' being satisfied by (KA—O)—, SiO—, —R and/or —Z, the groups Z are identical or different and are hydroxyl and/or alkoxy radicals, and each Si and Si' of the shell Et carries not more than one group R,
to the core A (KA—O).

It has also been found that said organosilicon nano/microhybrid systems or microhybrid systems are obtained in a simple and economical manner in a composition based on a curable synthetic resin or precursor compound of a curable synthetic resin, directly in the course of its preparation, and that a corresponding composition can be used as the basis for a coating material which, following application to a substrate or an article and subsequent curing, leads to outstanding scratch and abrasion resistance.

By a curable synthetic resin or a precursor of a curable synthetic resin, i.e., a liquid prepolymer or a mixture of such prepolymers, is meant hereinbelow, for example, acrylates, methacrylates, epoxy, polyurethane, unsaturated polyesters or mixtures thereof.

Furthermore, the present process produces oxide particles with a substantially complete and multilayer organosilicon shell, i.e., cores A which, directly and advantageously, are obtained in finely dispersed form in a curable synthetic resin or precursor of a curable synthetic resin.

In the present procedure, the product is generally the organosilicon microhybrid system or organosilicon nano/microhybrid system of the invention simultaneously incorporated homogeneously into the prepolymer.

Compositions obtained in this way are distinguished by surprisingly advantageous processing properties on preparation and application, since practice shows that, despite the corundum fraction in the composition, the organosilicon envelopment of the corundum particles means that no additional wear is found on the mixing and application equipment.

Dilatancy in paints can be a problem in technical processes generally and especially in the case of coatings made with the specialty paints. In general, the aim with such coating systems is for a viscosity of up to 2500 mPa s. Preferably, solvent-free coating materials of the invention possess a viscosity of >500 to 2000 mPa s, with particular preference 800 to 1000 mPa s. The viscosity can also be set by diluting the composition with a synthetic resin or corresponding prepolymer. For roller application, the viscosity should appropriately lie within the range from 0.8 to 1.2 Pa s.

It has been found that the viscosity of the dispersions can be reduced by diluting viscous formulations or paints, application at higher temperatures (typically 60° C.) or by formulating with special paint additives. With the addition, for example, of 9% by mass of a formulation, such as DPGDA with 30% by mass of AEROSIL OX 50 and 9% by mass of DYNASYLAN VTMO, it is possible to produce a further improvement in the rheology of a highly dilatant dispersion or composition.

In particular, paint systems containing DYNASYLAN® PTMO as silane component may exhibit dilatancy. As a result of using mixtures of DYNASYLAN® PTMO with the addition of VTMO, a particularly favorable rheology can be expected.

It has likewise been found that the present compositions can be used as coating material for producing a particularly scratch and abrasion resistant coating on substrates or on corresponding articles.

The coating is suitably cured photochemically by UV irradiation or by irradiation with electron beams. Irradiation is normally conducted at a temperature of from 10 to 60° C., advantageously at ambient temperature.

Accordingly, in a simple and economic way, coating materials comprising organosilicon nano/microhybrid capsules or exclusively microhybrid capsules can be used in accordance with the invention to obtain excellent scratch and abrasion resistance.

DESCRIPTION OF THE PREFERRED EMBODIMENTS

The present invention accordingly provides organosilicon nano/microhybrid systems or microhybrid systems composed of cores A, the cores A being oxide particles (KA—O) and comprising a mixture of (a) at least one nanoscale oxide and/or mixed oxide of at least one metal or semi-metal from main groups two to six or transition groups one to eight of the Periodic Table of the Elements, or of the lanthanides, and (b) a microscale corundum or being composed exclusively of microscale corundum (b), and an organosilicon shell B, the organosilicon shell B comprising at least one organosilicon constituent of the general formula Ia

(Si'O—)$_x$Si—R    (Ia)

in which groups R are identical or different and R is a linear, branched or cyclic alkyl group of 1 to 50 carbon atoms, preferably of 1 to 20 carbon atoms, particularly preferably of 1 to 16 carbon atoms, an alkenyl group of 2 to 6 carbon atoms, or a fluoroalkyl, chloroalkyl, isocyanoalkyl, cyanoalkyl, aryl, acylalkyl, acryloyloxyalkyl, methacryloyloxyalkyl, polysulfanealkyl, mercaptoalkyl, thiacyamidoalkyl, glycidyloxyalkyl, aminoalkyl, diaminoalkyl, triaminoalkyl, carbonatoalkyl or ureidoalkyl group and x is a number from 0 to 20, the remaining free valences of Si being satisfied by SiO— and/or —Z and the free valences of Si' being satisfied by SiO—, —R and/or —Z, the groups Z are identical or different and are hydroxyl or alkoxy radicals and each Si and Si' of the shell B carries not more than one group R, and/or the organosilicon constituent of the shell B being attached via one or more covalent linkages of the general formula Ib

(KA—O)—[(Si'O—)$_x$Si—R]    (Ib)

in which groups R are identical or different and R is a linear, branched or cyclic alkyl group of 1 to 50 carbon atoms, an alkenyl group of 2 to 6 carbon atoms, or a fluoroalkyl, chloroalkyl, isocyanoalkyl, cyanoalkyl, aryl, acylalkyl, acryloyloxyalkyl, methacryloyloxyalkyl, polysulfanealkyl, mercaptoalkyl, thiacyamidoalkyl, glycidyloxyalkyl, aminoalkyl, diaminoalkyl, triaminoalkyl, carbonatoalkyl or ureidoalkyl group and x is a number from 0 to 20, the remaining free valences of Si being satisfied by (KA—O)—, SiO— and/or —Z and the free valences of Si' being satisfied by (KA—O)—, SiO—, —R and/or —Z, the groups Z are identical or different and are hydroxyl or alkoxy radicals, and each Si and Si' of the shell B carries not more than one group R, to a core A (KA—O).

Preferred alkoxy radicals of the groups Z are those containing a linear, cyclic or branched alkyl radical of from 1 to 18 carbon atoms, and particularly preferred Z groups are methoxy, ethoxy, isopropoxy or n-propoxy groups.

In organosilicon nanohybrid and/or microhybrid capsules of the invention, the weight ratio between core A and shell B is preferably from 0.5:1 to 100:1, particularly preferred from 1:1 to 10:1, with very particularly preferred from 2:1 to 5:1.

A core A of said organosilicon nanocapsules is suitably composed of at least one nanoscale oxide and/or mixed oxide, including oxide hydroxides, from the series of the elements Si, Al, Ti and/or Zr, such as SiO$_2$, e.g., pyrogenic silica, silicates, alumina, boehmite, aluminum hydroxide, aluminosilicates, TiO$_2$, titanates, ZiO$_2$ or zirconates. A core A of a microhybrid capsule is generally composed of a microscale corundum particle.

Organosilicon nano/microhybrid systems or microhybrid systems of the invention are obtainable by reacting
(i) an oxide particle mixture composed of (a) at least one nanoscale oxide and/or mixed oxide of at least one metal or semi-metal from main groups two to six or transition groups one to eight of the Periodic Table of the Elements, or of the lanthanides, and (b) a microscale corundum, or a microscale corundum(b) with (ii) at least one organofunctional silane of the general formula II

$$R^1_s R^2_r SiY_{(4-s-r)} \tag{II}$$

in which the groups $R^1$ and $R^2$ are identical or different and are each a linear, branched or cyclic alkyl group of 1 to 50 carbon atoms, an alkenyl group of 2 to 6 carbon atoms or a chloroalkyl, isocyanoalkyl, cyanoalkyl, fluoroalkyl, aryl, acylalkyl, acryloyloxyalkyl, methacryloyloxyalkyl, polysulfanealkyl, mercaptoalkyl, thiacyamidoalkyl, glycidyloxyalkyl, aminoalkyl, diaminoalkyl, triaminoalkyl, carbonatoalkyl or ureidoalkyl group, Y is a methoxy, ethoxy, isopropoxy, n-propoxy or 2-methoxy-ethoxy group and s is 1 or 2 or 3 and r is 0 or 1 or 2, with the proviso that (s+r) is $\leq 3$, and (iii) if desired, a monomeric and/or oligomeric silicic ester which carries methoxy, ethoxy, n-propoxy or isopropoxy groups and has an average degree of oligomerization of from 1 to 50, such as tetramethoxysilane, e.g., DYNASIL® M, tetraethoxysilane, e.g., DYNASIL® A, tetrapropoxysilane, e.g., DYNASIL® P, or an oligomeric ethyl silicate, such as DYNASIL® 40, and (iv) if desired, an organofunctional siloxane in which the functionalities are identical or different and each silicon atom in the siloxane carries a functionality from the group consisting of alkyl, i.e., linear, branched or cyclic alkyls of 1 to 20 carbon atoms, fluoroalkyl, cyanoalkyl, isocyanoalkyl, alkenyl, aminoalkyl, diaminoalkyl, triaminoalkyl, alkoxyalkyl, hydroxyalkyl, acylalkyl, glycidyloxyalkyl, acryloyloxyalkyl, methacryloyloxyalkyl, mercaptoalkyl, ureidoalkyl, aryl and alkoxy, and the remaining free valences of the silicon atoms in the siloxane are satisfied by methoxy or ethoxy or hydroxyl groups, preferably siloxanes having an average degree of oligomerization of from 1 to 20, more preferably from 2 to 10, such as are disclosed, in particular, in the German patent applications 199 55 047.6, 199 61 972.7, EP 0 518 057, EP 0 590 270, EP 0 716 127, EP 0 716 128, EP 0 760 372, EP 0 814 110, EP0 832 911, EP0 846 717, EP0 846 716, EP0 846 715, EP0 953 591, EP 0 955 344, EP 0 960 921, EP 0 978 525, EP 0 930 342, EP 0 997 469, EP 1 031 593 and EP 0 075 697 (the siloxanes disclosed in each of the aforementioned applications and/or patents is incorporated herein by reference), in situ in a liquid, curable synthetic resin or synthetic resin precursor.

In accordance with the invention, this reaction is carried out using as component (a) preferably at least one nanoscale oxide and/or mixed oxide from the group consisting of the elements Si, Al, Ti and/or Zr, the nanoscale oxide preferably having an average particle size of from 1 to 200 nm. It is particularly preferred to use as component (a) a nanoscale silica.

In the process of the invention it is possible to use as oxide component (KA—O) exclusively microscale corundum (b) or an oxide particle mixture of components (a) and (b).

Accordingly, component (b) is preferably a microscale corundum ($\alpha$-Al$_2$O$_3$) with an average particle size of preferably from 3 to 40 $\mu$m, and particularly preferred from 9 to 18 $\mu$m, with very particular preference from 12 to 15 $\mu$m.

The present invention additionally provides a process for preparing a composition comprising an organosilicon nano/microhybrid system or microhybrid system, which comprises reacting (i) an oxide particle mixture composed of (a) at least one nanoscale oxide and/or mixed oxide of at least one metal or semi-metal from main groups two to six or transition groups one to eight of the Periodic Table of the Elements, or of the lanthanides, and (b) a microscale corundum, or a microscale corundum(b) with (ii) at least one organofunctional silane of the general formula II

$$R^1_s R^2_r SiY_{(4-s-r)} \tag{II}$$

in which the groups $R^1$ and $R^2$ are identical or different and are each a linear, branched or cyclic alkyl group of 1 to 50 carbon atoms, an alkenyl group of 2 to 6 carbon atoms or a chloroalkyl, isocyanoalkyl, cyanoalkyl, fluoroalkyl, aryl, acylalkyl, acryloyloxyalkyl, methacryloyloxyalkyl, polysulfanealkyl, mercaptoalkyl, thiacyamidoalkyl, glycidyloxyalkyl, aminoalkyl, diaminoalkyl, triaminoalkyl, carbonatoalkyl or ureidoalkyl group, the respective alkylene groups comprising 1 to 6 carbon atoms, Y is a methoxy, ethoxy, isopropoxy, n-propoxy or 2-methoxy-ethoxy group and s is 1 or 2 or 3 and r is 0 or 1 or 2, with the proviso that (s+r) is $\leq 3$, and (iii) if desired, a monomeric and/or oligomeric silicic ester which carries methoxy, ethoxy, n-propoxy or isopropoxy groups and has an average degree of oligomerization of from 1 to 50, and (iv) if desired, an organofunctional siloxane in which the functionalities are identical or different and each silicon atom in the siloxane carries a functionality from the group consisting of alkyl, fluoroalkyl, cyanoalkyl, isocyanoalkyl, alkenyl, aminoalkyl, diaminoalkyl, triaminoalkyl, alkoxyalkyl, hydroxyalkyl, acylalkyl, glycidyloxyalkyl, acryloyloxyalkyl, methacryloyloxyalkyl, mercaptoalkyl, ureidoalkyl, aryl and alkoxy, and the remaining free valences of the silicon atoms in the siloxane are satisfied by methoxy or ethoxy or hydroxyl groups, in situ in a liquid, curable synthetic resin or synthetic resin precursor.

The reaction is generally conducted in a heatable stirred vessel. However, other mixing equipment can also be used, especially in the case of systems having a relatively high solids content; for example, a cone mixer or a kneading apparatus can be used. Suitably, however, it is also possible to use a combined machine for predispersion, by means of a dissolver disk, and subsequent fine milling, by means of an immersion mill, such as is offered, for example, under the name TORUSMILL® by VMA-Getzmann GmbH.

A suitable procedure when implementing the process of the invention is to initially introduce the curable synthetic resin or a precursor of a curable synthetic resin and heat it, to add catalyst, wetting agent if desired, and water, to introduce components (ii) to (iv), and then to add the oxide component (i) with thorough mixing.

In the process of the invention, the curable synthetic resin or precursor of a curable synthetic resin that is used is preferably an acrylate, methacrylate, epoxide, epoxy resin, polyurethane, polyurethane resin, unsaturated polyester, unsaturated polyester resin, epoxy acrylate, polyester acrylate, urethane acrylate, silicone acrylate, or mixtures of two or more of the aforementioned components.

Organofunctional silanes of formula II include the following compounds: methyltrimethoxysilane (DYNASYLAN® MTMS), methyltriethoxysilane (DYNASYLAN® MTES), propyltrimethoxysilane (DYNASYLAN® PTMO) propyltriethoxysilane DYNASYLAN® PTEO), i-butyltrimethoxysilane (DYNASYLAN® IBTMO), i-butyltriethoxysilane (DYNASYLAN® IBTEO), octyltrimethoxysilane (DYNASYLAN® OCTMO), octyltriethoxysilane (DYNASYLAN® OCTEO), hexadecyltrimethoxysilane (DYNASYLAN® 9116), hexadecyltriethoxysilane (DYNASYLAN® 9216), 3-chloropropyltrialkoxysilanes, 3-bromopropylalkoxysilanes, 3-iodopropylalkoxysilanes, 3-chloropropyltrichlorosilanes, 3-chloropropylmethyldialkoxysilanes, 3-chloropropylmethyldichlorosilanes, 3-chloropropyldimethylalkoxysilanes, 3-chloropropyldimethylchlorosilanes, 3-aminopropylmethyldialkoxysilanes, 3-aminopropyltrialkoxysilanes, including 3-aminopropyltrimethoxysilane (DYNASYLAN® AMMO), 3-aminopropyltriethoxysilane (DYNASYLAN® AMEO), N-(n-butyl)-3-aminopropyltrimethoxysilane (DYNASYLAN® 1189), n-aminoethyl-3-aminopropylmethyldimethoxysilane (DYNASYLAN® 1411), 3-aminopropylmethyldiethoxysilane (DYNASYLAN® 1505), N-aminoethyl-3-aminopropylmethyldialkoxysilane, N-aminoethyl-3-aminopropyltrimethoxysilane (DYNASYLAN® DAMO), triamino-functional propyltrimethoxysilane (DYNASYLAN® TRIAMO), including [N-aminoethyl-N'-(3-trialkoxysilylpropyl)]ethylenediamines and also [N-aminoethyl-N-(3-trialkoxysilylpropyl)]ethylenediamines, triamino-functional propylmethyldialkoxysilanes, 3-(4,5-dihydroimidazolyl) propyltriethoxysilane (DYNASYLAN® IMEO), 3-methacryloyloxypropylalkoxysilanes, 3-methacryloyloxypropyltrimethoxysilane (DYNASYLAN® MEMO), 3-methacryloyloxyisobutyltrialkoxysilanes, 3-glycidyloxypropyltrialkoxysilanes, 3-glycidyloxypropyltrimethoxysilane (DYNASYLAN® GLYMO), 3-glycidyloxypropyltriethoxysilane (DYNASYLAN® GLYEO), 3-glycidyloxypropylmethyldiethoxysilane, 3-mercaptopropylalkoxysilanes, 3-mercaptopropyltrimethoxysilane (DYNASYLAN® MTMO), vinyltrialkoxysilanes, including vinyltrimethoxysilane (DYNASYLAN® VTMO), vinyltriethoxysilane (DYNASYLAN® VTEO), vinyltris(2-methoxyethoxy) silane (DYNASYLAN® VTMOEO), perfluoroalkyltrialkoxysilanes, fluoroalkyltrialkoxysilanes, including tridecafluorooctyltrimethoxysilane, tridecafluorooctyltriethoxysilane (DYNASYLAN® F 8261), tridecafluorooctylmethyldialkoxysilanes, trimethylchlorosilane, triethylchlorosilane, $(H_5C_2O)_3Si(CH_2)_3—S_4—(CH_2)_3Si(OC_2H_5)_3$ 1,4-bis(3-triethoxysilylpropyl)tetrasulfane (Si-69) $(H_5C_2O)_3Si(CH_2)_3$—NCS 3-thiacyamidopropyltriethoxysilane (Si-264), $(H_5C_2O)_3Si(CH_2)_3$—S2-$(CH_2)_3Si(OC_2H_5)_3$ 1,2-bis(3-triethoxysilylpropyl)disulfane (Si-266), 3-cyanopropyltrialkoxysilanes, including 3-cyanopropyltrimethoxysilane, N,N',N"-tris (trimethoxysilylpropyl)triisocyanurate, 3-[methoxy (polyethyleneglycidyl)]-propyltrialkoxysilanes, allyltrialkoxysilanes, allylmethyldialkoxysilane, allyldimethylalkoxysilane, 3-methacryloyloxy-2-methylpropyltrialkoxysilanes, 3-amino-2-methylpropyltrialkoxysilanes, (cyclohex-3-enyl) ethyltrialkoxysilanes, N-(3-trialkoxysilylpropyl) alkylcarbamates, 3-azidopropyltrialkoxysilanes, 4-(2-trialkoxysilylethyl)-1,2-epoxycyclohexanes, bis(3-alkoxysilylpropyl)amines, tris(3-alkoxysilylpropyl)amines, 3-acryloyloxypropyltrialkoxysilanes, including 3-acryloyloxymethyldialkoxysilans, 3-acryloyloxy-dimethylalkoxysilane, in which one of the aforementioned alkoxy groups is advantageously methoxy, ethoxy, 2-methoxyethoxy, propoxy or acetoxy.

As component (ii) it is particularly preferred in accordance with the invention to use 3-methacryloyloxypropyltrimethoxysilane, 3-methacryloyloxypropyltriethoxysilane, 3-methacryloyloxypropylmethyldimethoxysilane, 3-methacryloyloxypropylmethyldiethoxysilane, 3-methacryloyloxy-2-methylpropyltrimethoxysilane, 3-methacryloyloxy-2-methylpropyltriethoxysilane, vinyltrimethoxysilane, vinyltriethoxysilane, vinylmethyldimethoxysilane, vinylmethyldiethoxysilane, n-propyltrimethoxysilane and/or n-propyltriethoxysilane.

The process of the invention is suitably carried out by initially introducing the generally liquid components of the prepolymer and heating them, adding a defined amount of water, catalyst if desired, wetting agent if desired, and the organosilicon components (ii) to (iv), and subsequently introducing the oxide component (i) with thorough mixing. Appropriately, in other words, first of all the synthetic resin components, catalyst, wetting assistant, water, and the organosilicon components, together where appropriate with further auxiliaries, e.g., stabilizer, are combined and mixed and only then is the oxide component (i) added. A component mixture obtained in accordance with this method of preparation is particularly notable, inter alia, for good processing properties.

In the process of the invention it is preferred to use from 0.1 to 80% by weight, preferably from 5 to 70% by weight, with particular preference from 15 to 50% by weight, with very particular preference from 20 to 40% by weight, in particular ≦60% by weight, of oxide component (i) (KA—O), based on the synthetic resin.

Where, in the present process, an oxide particle mixture of (a) and (b) is used as oxide component (i), preference is given to an (a):(b) weight ratio of from 1:10 to 5:1. It is particularly preferred to use an oxide particle mixture with a weight ratio of components (a) and (b) of from 1:3 to 1:1, with very particular preference 1:2.

In the process of the invention a nanoscale oxide and/or nanoscale mixed oxide (a) having an average particle diameter of preferably from 1 to 100 nm, with particular preference from 5 to 50 nm, and, with very particular preference, from 10 to 40 nm is used. The oxides and/or mixed oxides (a) may have a BET surface area of from 40 to 400 m²/g, preferably from 60 to 250 m²/g, with particular preference from 80 to 250 m²/g. As nanoscale oxides or mixed oxides (a) it is possible to use for example, but not exclusively, pyrogenic silica, which may be modified by further metal or semi-metal fractions, such as aluminum, titanium, iron or zirconium.

As oxide component (b) it is preferred to use a microscale corundum having an average particle size $d_{50}$ of from 9 to 15 μm.

It is further preferred to use the oxide component (i), composed of the individual components (a) and (b) or of (b), and at least one silane-based component, particularly (ii), (iii) and/or (iv), in a weight ratio of from 100:1 to 0.5:1, with particular preference from 10 to 1:1, with very particular preference from 5 to 2:1.

As liquid and/or curable synthetic resin or as precursor of a liquid, curable synthetic resin, i.e., a prepolymer or a mixture of prepolymers, use is made in the process of the invention of, for example, acrylates, methacrylates, epoxides, epoxy resins, polyurethanes, polyurethane resins, unsaturated polyesters, unsaturated polyester resins, epoxy acrylates, polyester acrylates, urethane acrylates, silicone acrylates, polyfunctional monomeric, acrylates, such as trimethylolpropane triacrylate, trimethylolpropane trimethacrylate, ethoxylated trimethylolpropane triacrylate, propoxylated trimethylolpropane triacrylate, pentaerythritol triacrylate, ethoxylated pentaerythritol tetraacrylate, alkoxylated tetraacrylates, di-trimethylolpropane tetraacrylates, 3,4-epoxycyclohexyl-1-methyl 3,4-epoxycyclohexane-1'-carboxylate, and 1,6-hexanediol diacrylate, to name only a few examples, or mixtures of two or more of the aforementioned synthetic resins or prepolymers, examples being mixtures of monofunctional and/or bifunctional and/or polyfunctional monomeric acrylates, which may be of low viscosity.

The reaction of the invention takes place generally in the presence of a well-defined amount of water. For this purpose it is suitable to use from 1 to 6 mol of water per mole of Si of the organosilicon component.

In the present process said reaction takes place preferably in the presence of defined amounts of water. It is preferred to use from 0.5 to 6 mol, with particular preference from 0.5 to 4 mol, with very particular preference from 1 to 2.0 mol, of water per mole of a hydrolyzable, Si-bonded group in the organosilicon components.

Additionally, the reaction of the invention is preferably conducted in the presence of a catalyst. A particularly suitable catalyst is an acid, preferably maleic anhydride, maleic acid, acetic acid, acetic anhydride, glycolic acid, citric acid, methanesulfonic acid or phosphoric acid.

In addition, the use of a wetting agent may be useful for conducting the reaction of the invention. Accordingly, the reaction is preferably conducted in the presence of sodium dodecyl sulfate.

In the process of the invention the reaction is preferably conducted at a temperature in the range from 30 to 100° C., preferably at a temperature in the range from 50 to 80C.

Hydrolysis and condensation in the reaction of the invention generally produces an alcohol, which is preferably removed from the reaction system during the reaction and/or thereafter. The removal of the alcohol formed in the reaction may be carried out distillatively, suitably under reduced pressure. In general, the alcohol content of the product mixture, i.e., in the composition obtained as a result of the reaction of the invention, is lowered to <2% by weight, preferably to from 0.01 to 1% by weight, with particular preference to from 0.1 to 0.5% by weight, thereby giving advantageously a solvent-free composition, i.e., a solvent-free paint base or a solvent-free varnish.

Such compositions of the invention can be used directly or following addition of further paint components, for the scratch resistant coating of substrates.

Coating the substrate with the present composition may in general be carried out with comparatively little effort, owing to the tow viscosity of the composition.

The present invention additionally provides a composition or coating material based on a curable synthetic resin.

Compositions of the invention are used in particular as a coating material or as a base component for preparing a coating composition or coating material for producing scratch and abrasion resistant coatings.

In general, compositions of the invention can be used for coating purposes and may be cured free-radically, thermally, photochemically and/or radiation-chemically.

Suitably, further components can be added to the composition or coating material of the invention, examples being initiators for UV or photochemical or radiation-chemical paint curing, DAROCUR® 1173, LUCIRIN® TPO-L, paint stabilizers, such as HALS compounds, TINUVINE®, and antioxidants, such as IRGANOX®. Such additives are generally used in amounts of from 0.1 to 5% by weight, preferably from 0.5 to 2% by weight, based on the formulation or paint. Further components are suitably introduced into the paint system with thorough mixing. An advantageous feature of the formulations and paints of the invention, despite the high level of polymerizable organosilicon nanocapsules, is, preferably, a comparatively low viscosity of from 500 to 1000 mPa s. The systems generally exhibit dilatant behavior.

Accordingly, the invention further provides for the use of a composition of the invention as a coating material or as a base for the preparation of a coating composition or coating material for producing scratch and abrasion resistant coatings.

The composition of the invention or a coating material of the invention is generally applied by application to a substrate. The coating of substrates can be carried out using the customary coating techniques, such as roller application, knife-coating, dipping, flooding, pouring, spraying, or spreading, for example.

By way of example, the formulation of the invention or the paint can be applied uniformly to substrates in web form, such as paper or metal foils or polymer films, by using a roll applicator mechanism, and then cured. Being solvent free, the coating is able to cure in an environment-friendly way, suitably at ambient temperature, i.e., painting temperature, by a UV or electron beam (EBC) process.

For electron beam curing it is preferred to generate electrons having an energy of around 140 keV, the dose being from 30 to 60 kGy, preferably from 40 to 50 kGy. The residual $O_2$ content is preferably <200 ppm. Photochemical curing is suitably performed under inert gas, such as under nitrogen or argon, for example.

Paint curing can also be carried out, however, by means of UV irradiation using monochromatic or polychromatic UV lamps; with a wavelength of from 150 to 400 nm. With UV curing as well it is possible to operate at ambient temperature, between 10 and 60° C. for example. Here again, the $O_2$ content is suitably <200 ppm.

Accordingly, by using compositions and paints of the invention, it is possible with particular advantage, to produce scratch and abrasion resistant coatings. The scribe hardness or scratch resistance here is generally determined in accordance with DIN 53 799 using a hard metal ball. The abrasion can be determined, for example, in accordance with DIN 52 347 using coated plane disks.

A composition or paint of the invention can be applied to a surface or substrate and the coating can be cured chemically, oxidatively for example, using peroxide and elevated temperature, for example.

The present invention therefore provides scratch and abrasion resistant coatings obtainable by applying and curing a composition or coating material of the invention.

Coatings of the invention preferably have a film thickness of from 20 to 200 μm, and more preferably from 5 to 50 μm, and most preferred from 5 to 20 μm.

Thus, for example, metals, such as aluminum, iron, steel, brass, copper, silver, magnesium, nonferrous metal alloys, wood, paper, cardboard, textiles, stoneware, plastics, including thermoplastics, polycarbonate, glass, and ceramic can be provided with a particularly scratch and abrasion resistant coating in a particularly simple and economic way. There are no restrictions on the selection of the substantially solid substrate materials for coating. Such substrates can be provided, for example, with a protective coating, a so-called "topcoating", as is employed, for example, as a clearcoat system in the, automobile industry.

By the present coating process it is possible to obtain scratchproofed articles in a simple and economical way, in particular, such as decorative paper, aluminum foils, polycarbonate auto glazing, PVC windowframes, doors, worktops, floor coverings, and wood block floors, to name but a few.

Furthermore, the present invention provides articles having a coating according to the invention.

The present invention is illustrated by the following examples which are not intended to limit the invention. Obviously, numerous modifications and variations of the present invention are possible in light of the above teachings. It is therefore to be understood that within the scope of the appended claims, the invention may be practiced otherwise than as specifically described herein.

EXAMPLES

Materials Used

EBECRYL® EB 5129: mixture of aliphatic urethane hexaacrylate and pentaerythritol tri/tetraacrylate from UCB Chemical.

EBECRYL® 1290: hexafunctional aliphatic urethane acrylate from UCB Chemicals.

DPGDA: dipropylene glycol diacrylate from UCB Chemicals.

HDDA: 1,6-hexanediol diacrylate from UCB Chemicals.

SARTOMER® SR 494: ethoxylated pentaerythritol tetraacrylate from Cray Valley.

DYNASYLAN® VTMO: vinyltrimethoxysilane from DEGUSSA AG.

DYNASYLAN® PTMO: propyltrimethoxysilane from DEGUSSA AG.

DYNASYLAN® MEMO: methacryloyloxypropyltrimethoxysilane from DEGUSSA AG.

PLAKOR® 13: synthetic corundum (corundum micropowder, $d_{50}$=13 μm) from ESK-SIC GmbH.

AEROSIL® OX 50: pyrogenic silica (amorphous, BET=50 $m^2/g$, $d_{50}$=30 nm).

AEROSIL® 200: pyrogenic silica (amorphous, BET=200 $m^2/g$, $d_{50}$=30 nm).

Example 1

A stirred vessel is charged with 19.49 kg of EB 5129 and 3.71 kg of DPGDA and also 48 g of 4-hydroxyanisole and this initial charge is heated to 65–70° C. A solution of 0.15 kg of maleic anhydride in 1.364 kg of water and also, over the course of 30 minutes, 4.988 kg of DYNASYLAN® VTMO are added to the heated acrylate. Subsequently, 11.13 kg of PLAKOR® 13 and 5.57 kg of AEROSIL® OX 50 are metered in over the course of 1 hour with thorough stirring, within the temperature range indicated above. Stirring is continued at 65–70° C. for 1 hour more and then the methanol formed as a result of the silane's hydrolysis is distilled off under reduced pressure. Finally, the batch is cooled to room temperature.

Example 2

A stirred vessel is charged with 19.49 kg of EB 1290 and 3.71 kg of HDDA and also 48 g of 4-hydroxyanisole and this initial charge is heated to 65–70° C. A solution of 0.15 kg of maleic anhydride in 1.364 kg of water and also, over the course of 30 minutes, 4.988 kg of DYNASYLAN® VTMO are added to the heated acrylate. Subsequently, 11.13 kg of PLAKOR® 13 and 5.57 kg of AEROSIL® OX 50 are metered in over the course of 1 hour with thorough stirring, within the temperature range indicated above. Stirring is continued at 65–70° C. for 1 hour more and then the methanol formed as a result of the silane's hydrolysis is distilled off under reduced pressure. Finally, the batch is cooled to room temperature.

Example 3

A stirred vessel is charged with 19.49 kg of EB 1290 and 3.71 kg of HDDA and also 48 g of 4-hydroxyanisole and this initial charge is heated to 65–70° C. A solution of 0.15 kg of maleic anhydride in 1.364 kg of water and also, over the course of 30 minutes, 4.988 kg of DYNASYLAN® VTMO are added to the heated acrylate. Subsequently, 5.57 kg of PLAKOR® 13 and 11.13 kg of AEROSIL® OX 50 are metered in over the course of 1 hour with thorough stirring, within the temperature range indicated above. Stirring is continued at 65–70° C. for 1 hour more and then the methanol formed as a result of the silane's hydrolysis is distilled off under reduced pressure. Finally, the batch is cooled to room temperature.

Example 4

A stirred vessel is charged with 15.78 kg of EB 1290 and 7.43 kg of HDDA and also 48 g of 4-hydroxyanisole and this initial charge is heated to 65–70° C. A solution of 0.15 kg of maleic anhydride in 1.364 kg of water and also, over the course of 30 minutes, 4.988 kg of DYNASYLAN® VTMO are added to the heated acrylate. Subsequently, 6.96 kg of PLAKOR® 13 and 9.74 kg of AEROSIL® OX 50 are metered in over they course of 1 hour with thorough stirring, within the temperature range indicated above. Stirring is continued at 65–70° C. for 1 hour more and then the methanol formed as a result of the silane's hydrolysis is distilled off under reduced pressure. Finally, the batch is cooled to room temperature.

Example 5

A stirred vessel is charged with 15.78 kg of EB 1290 and 7.43 kg of DPGDA and also 48 g of 4-hydroxyanisole and this initial charge is heated to 65–70° C. A solution of 0.15 kg of maleic anhydride in 1.364 kg of water and also, over the course of 30 minutes, 4.988 kg of DYNASYLAN® VTMO are added to the heated acrylate. Subsequently, 6.96 kg of PLAKOR® 13 and 9.74 kg of AEROSIL® OX 50 are metered in over the course of 1 hour with thorough stirring, within the temperature range indicated above. Stirring is continued at 65–70° C. for 1 hour more and then the methanol formed as a result of the silane's hydrolysis is distilled off under reduced pressure. Finally, the batch is cooled to room temperature.

Example 6

A stirred vessel is charged with 15.78 kg of EB 1290 and 7.43 kg of DPGDA and also 48 g of 4-hydroxyanisole and this; initial charge is heated to 65–70° C. A solution of 0.15 kg of maleic anhydride in 1.364 kg of water and also, over the course of 30 minutes, 5.528 kg of DYNASYLAN® PTMO are added to the heated acrylate. Subsequently, 6.96 kg of PLAKOR® 13 and 9.74 kg of AEROSIL® OX 50 are metered in over the course of 1 hour with thorough stirring, within the temperature range indicated above. Stirring is continued at 65–70° C. for 1 hour more and then the methanol formed as a result of the silane's hydrolysis is distilled off under reduced pressure. Finally, the batch is cooled to room temperature.

Example 7

A stirred vessel is charged with 12.06 kg of EB 1290 and 11.14 kg of DPGDA and also 48 g of 4-hydroxyanisole and this initial charge is heated to 65–70° C. A solution of 0.15 kg of maleic anhydride in 1.364 kg of water and also, over the course of 30 minutes, 4.988 kg of DYNASYLAN® VTMO are added to the heated acrylate. Subsequently, 6.96 kg of PLAKOR® 13 and 30 9.74 kg of AEROSIL® OX 50 are metered in over the course of 1 hour with thorough stirring, within the temperature range indicated above. Stirring is continued at 65–70° C. for 1 hour more and then the methanol formed as a result of the silane's hydrolysis is distilled off under reduced pressure. Finally, the batch is cooled to room temperature.

Example 8

A stirred vessel is charged with 15.776 kg of EB 1290, 7.425 kg of DPGDA and also 48 g of 4-hydroxyanisole and this initial charge is heated to 65–70° C. A solution of 0.15 kg of maleic anhydride in 1.3643 kg of water and also, over the course of 30 minutes, a mixture of 2.494 kg each of DYNASYLAN® VTMO and DYNASYLAN® PTMO are added to the heated acrylate. Subsequently, 6.959 kg of PLAKOR® 12 and 9.742 kg of AEROSIL® OX 50 are metered in over the course of 1 hour with thorough stirring, within the temperature range indicated above. Stirring is continued at 65–70° C. for 1 hour more. Finally, the batch is cooled to room temperature as quickly as possible.

Comparative Example A

A stirred vessel is charged with 29.2 kg of SARTOMER® SR 494 and also 48 g of 4-hydroxyanisole and this initial charge is, heated to 65–70° C. A solution of 0.15 kg of maleic anhydride in 0.525 kg of water and also, over the course of 30 minutes, 3.6 kg of DYNASYLAN®MEMO are added to the heated acrylate. Subsequently, 7.2 kg of AEROSIL® 200 are metered in over the course of 1 hour with thorough stirring, within the temperature range indicated above. Stirring is continued at 65–70° C. for 3 hours more and then the methanol formed as a result of the silane's hydrolysis is distilled off under reduced pressure. Finally, the batch is cooled to room temperature.

Comparative Example B

A stirred vessel is charged with 29.2 kg of SARTOMER® SR 494 and also 48 g of 4-hydroxyanisole and this initial charge is heated to 65–70° C. A solution of 0.15 kg of maleic anhydride in 0.597 kg of water and also, over the course of 30 minutes, 2.15 kg of DYNASYLAN® VTMO are added to the heated acrylate. Subsequently, 7.2 kg of AEROSIL® 200 are metered in over the course of 1 hour with thorough stirring, within the temperature range indicated above. Stirring is continued at 65–70° C. for 1 hour more and then the methanol formed as a result of the silane's hydrolysis is distilled off under reduced pressure. Finally, the batch is cooled to room temperature.

Comparative Example C

A stirred vessel is charged with 29.2 kg of SARTOMER® SR 494 and also 48 g of 4-hydroxyanisole and this initial charge is heated to 65–70° C. A solution of 0.15 kg of maleic anhydride in 0.597 kg of water and also, over the course of 30 minutes, 2.4 kg of DYNASYLAN® PTMO are added to the heated acrylate. Subsequently, 7.2 kg of AEROSIL® 200 are metered in over the course of 1 hour with thorough stirring, within the temperature range indicated above. Stirring is continued at 65–70° C. for 1 hour more and then the methanol formed as a result of the silane's hydrolysis is distilled off under reduced pressure. Finally, the batch is cooled to room temperature.

Comparative Example D

A stirred vessel is charged with 15.78 kg of EB 1290 and 7.425 kg of HDDA and also 48 g of 4-hydroxyanisole and this initial charge is heated to 65–70° C. A solution of 0.15 kg of maleic anhydride in 0.8 kg of water and also, over the course of 30 minutes, 2.91 kg of DYNASYLAN® VTMO are added to the heated acrylate. Subsequently, 9.74 kg of AEROSIL® OX 50 are metered in over the course of 1 hour with thorough stirring, within the temperature range indicated above. Stirring is continued at 65–70° C. for 1 hour more and then the methanol formed as a result of the silane's hydrolysis is distilled off under reduced pressure. Finally, the batch is cooled to room temperature.

Comparative Example E

A stirred vessel is charged with 15.78 kg of EB 1290 and 7.425 kg of HDDA and also 48 g of 4-hydroxyanisole and this initial charge is heated to 65–70° C. A solution of 0.15 kg of maleic anhydride in 0.8 kg of water and also, over the course of 30 minutes, 3.226 kg of DYNASYLAN® PTMO are added to the heated acrylate. Subsequently, 9.74 kg of AEROSIL® OX 50 are metered in over the course of 1 hour with thorough stirring, within the temperature range indicated above. Stirring is continued at 65–70° C. for 1 hour more and then the methanol formed as a result of the silane's hydrolysis is distilled off under reduced pressure. Finally, the batch is cooled to room temperature.

Coating Examples

The paints from examples 1 to 7 and comparative examples A to E were applied to decorative paper using a coating bar with a gap width of 25 μm, for determining the abrasion, and to square PVC panels (edge length 10 cm, thickness 2 mm) using a coating bar with a gap width of 50 μm, for determining the scribe hardness, and cured with a dose of 50 kGy in a low energy electron accelerator (140 keV). The residual oxygen content in the accelerator was <200 ppm.

The specimens are tested for their scribe hardness in accordance with DIN 53 799 using a diamond tip and a hard metal ball. The specimens are also tested for abrasion resistance in accordance with DIN 52 347 and ASTM D-1044 using S-42 emery paper, 2 rubbing wheels with 100 and 500 revolutions, and in accordance with DIN 68 861, using S-42 emery paper, 2 CS-O rubbing wheels with 50 and 1000 revolutions. The test results are compiled in table 1.

TABLE 1

Comparison of the test results for Examples 1 to 8 and comparative Examples A to E

| Specimen | Scribe hardness to DIN 53 799 diamond/hard metal ball[1] [N] | Haze to DIN 52347[2] and ASTM D-1044[2] 100R/500R [%] | Special Taber Abraser test to DIN 68 861 50R/1000R [mg] |
|---|---|---|---|
| Example 1 EB 5129/DPGDA, PLAKOR 13/OX 50, DYNASYLAN VTMO | 4.0/>10[3] | —[4] | 0.4/4.4 |
| Example 2 EB 1290/HDDA, PLAKOR 13/OX 50 DYNASYLAN VTMO | 4.0/>10[3] | —[4] | 0.4/4.1 |
| Example 3 EB 1290/HDDA, PLAKOR 13/OX 540, DYNASYLAN VTMO | 3.0/>10[3] | —[4] | 0.7/8.1 |
| Example 4 EB 1290/HDDA, PLAKOR 13/OX 50 DYNASYLAN VTMO | 3.0/>10[3] | —[4] | 1.6/15.3 |
| Example 5 EB 1290/DPGDA, PLAKOR 13/OX 50 DYNASYLAN VTMO | 3.0/>10[3] | —[4] | 0.5/6.1 |
| Example 6 EB 1290/DPGDA, PLAKOR 13/OX 50 DYNASYLAN PTMO | 2.0/>10[3] | —[4] | 3.9/12.4 |
| Example 7 EB 1290/DPGDA, PLAKOR 13/OX 50 DYNASYLAN VTMO | 3.0/>10[3] | —[4] | 2.7/5.8 |
| Example 8 EB 1290/DPGDA, PLAKOR 13/AEROSIL OX 50 DYNASYLAN VTMO | 3.0/8.5 | — | 1.2/6.9 |
| Comparative Example A SR 494/AEROSIL 200 DYNASYLAN MEMO | 1.5/9.0 | 3.3/14.4 | 21.1/— |
| Comparative Example B SR 494/AEROSIL 200 DYNASYLAN VTMO | 2.5/9.0 | 0.8/3.2 | 16.4/— |
| Comparative Example C SR 494/AEROSIL 200 DYNASYLAN PTMO | 1.75/9.0 | 2.1/8.5 | 19.8/— |
| Comparative Example D EB 1290/HDDA AEROSIL OX 50 DYNASYLAN VTMO | 3.0/>10[3] | — | 14.8/— |
| Comparative Example E EB 1290/HDDA, AEROSIL OX 50 DYNASYLAN PTMO | 3.0/>10[3] | — | 19.2/— |

Notes for Table 1
[1] 1 mm diameter
[2] Determination of abrasion resistance by light scattering (haze) after 100 and 500 Taber revolutions, 2 rubbing wheels CS-10, F = 5.5 ± 0.2 N, 3 individual measurements, arithmetic mean
[3] outside the measuring range of 10 N
[4] haze values not representative owing to inherent clouding (microparticles and agglomerated AEROSIL ®)

Obviously, numerous modifications and variations of the present invention are possible in light of the above teachings. It is therefore to be understood that within the scope of the appended claims, the invention may be practiced otherwise than as specifically described herein.

German patent applications 101 16201.4 and 101 41690.3 filed on Mar. 30, 2001 and Aug. 25, 2001 are incorporated herein by reference in their entirety.

What is claimed is:

1. An organosilicon nano/microhybrid system or microhybrid system comprising one or more cores A and an organosilicon shell B,
wherein the cores A comprise one or more oxide particles (KA—O) and an oxide particle mixture of (a) at least one nanoscale oxide and/or mixed oxide of at least one metal or semi-metal from main groups two to six or transition groups one to eight of the Periodic Table of the Elements, or of the lanthanides, and/or (b) a microscale corundum.

and the organosilicon shell B comprises at least one organosilicon constituent of formula Ia

wherein each R may be the same or different and each R may be a linear, branched or cyclic alkyl group of 1 to 50 carbon atoms, an alkenyl group of 2 to 6 carbon atoms, or a fluoroalkyl, chloroalkyl, isocyanoalkyl, cyanoalkyl, aryl, acylalkyl, acryloyloxyalkyl, methacryloyloxyalkyl, polysulfanealkyl, mercaptoalkyl, thiacyamidoalkyl, glycidyloxyalkyl, aminoalkyl, diaminoalkyl, triaminoalkyl, carbonatoalkyl or ureidoalkyl group, x is a number from 0 to 20, the remaining free valences of Si satisfied by SiO— and/or —Z, and the free valences of Si' satisfied by SiO—, —R and/or —Z, wherein the groups Z may be the same or different and each may be a hydroxyl or alkoxy radical, and each Si and Si' of the shell B carries not more than one group R, wherein the organosilicon constituent of the shell B is attached to the oxide particles (KA—O) through one or more covalent linkages of formula Ib

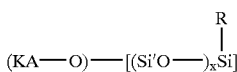  (Ib)

wherein each R may be the same or different and R may be a linear, branched or cyclic alkyl group of 1 to 50 carbon atoms, an alkenyl group of 2 to 6 carbon atoms, or a fluoroalkyl, chloroalkyl, isocyanoalkyl, cyanoalkyl, aryl, acylalkyl, acryloyloxyalkyl, methacryloyloxyalkyl, polysulfanealkyl, mercaptoalkyl, thiacyamidoalkyl, glycidyloxyalkyl, aminoalkyl, diaminoalkyl, triaminoalkyl, carbonatoalkyl or ureidoalkyl group, x is a number from 0 to 20, the remaining free valences of Si satisfied by (KA—O)—, SiO— and/or —Z, and the free valences of Si' satisfied by (KA—O)—, SiO—, —R and/or —Z, wherein each Z group may be identical or different and each may be a hydroxyl or alkoxy radical, and each Si and Si' of the shell B carries not more than one group R.

2. The nano/microhybrid system or microhybrid system of claim 1, wherein component (a) of the oxide particle mixture is at least one nanoscale oxide and/or mixed oxide selected from the group consisting of oxides and mixed oxides of Si, Al, Ti, Zr and mixtures thereof, and has an average particle size of from 1 to 200 nm.

3. The nano/microhybrid system or microhybrid system of claim 1, wherein component (b) is a microscale corundum and has an average particle size of from 3 to 40 μm.

4. A process for preparing a composition comprising the organosilicon nano/microhybrid system or microhybrid system of claim 1, which comprises reacting (i) an oxide particle mixture comprising (a) at least one nanoscale oxide and/or mixed oxide of at least one metal or semi-metal from main groups two to six or transition groups one to eight of the Periodic Table of the Elements, or of the lanthanides, and/or (b) a microscale corundum, with (ii) at least one organofunctional silane of formula II

  (II)

in which each of the groups $R^1$ and $R^2$ may be the same or different and each may be a linear, branched or cyclic alkyl croup of 1 to 50 carbon atoms, an alkenyl group of 2 to 6 carbon atoms or a chloroalkyl, isocyanoalkyl, cyanoalkyl, fluoroalkyl, aryl, acylalkyl, acryloyloxyalkyl, methacryloyloxyalkyl, polysulfanealkyl, mercaptoalkyl, thiacyamidoalkyl, glycidyloxyalkyl, aminoalkyl, diaminoalkyl, triaminoalkyl, carbonatoalkyl or ureidoalkyl group, wherein the alkylene groups comprise 1 to 6 carbon atoms, Y may be a methoxy, ethoxy, isopropoxy, n-propoxy or 2-methoxy ethoxy group, s is 1, 2 or 3, r is 0, 1 or 2, and (s+r) is ≦3, in a liquid, curable synthetic resin or curable synthetic resin precursor.

5. The process of claim 4 further comprising reacting (i) and/or (ii) with (iii) a monomeric and/or oligomeric silicic ester which carries methoxy, ethoxy, n-propoxy or isopropoxy groups and has an average degree of oligomerization of from 1 to 50.

6. The process of claim 4 further comprising reacting (i) and/or (ii) with (iv) an organofunctional siloxane in which the functionalities may be the same or different and each silicon atom in the siloxane carries a functionality selected from the group consisting of alkyl, fluoroalkyl, cyanoalkyl, isocyanoalkyl, alkenyl, aminoalkyl, diaminoalkyl, triaminoalkyl, alkoxyalkyl, hydroxyalkyl, acylalkyl, glycidyloxyalkyl, acryloyloxyalkyl, methacryloyloxyalkyl, mercaptoalkyl, ureidoalkyl, aryl and alkoxy, and the remaining free valences of the silicon atoms in the siloxane may be satisfied by methoxy, ethoxy or hydroxyl groups.

7. The process of claim 4, wherein the curable synthetic resin or curable synthetic resin precursor is selected from the group consisting of an acrylate, methacrylate, epoxide, epoxy resin, polyurethane, polyurethane resin, unsaturated polyester, unsaturated polyester resin, epoxy acrylate, polyester acrylate, urethane acrylate, silicone acrylate and mixtures thereof.

8. The process of claim 4, wherein from 0.1 to 80% by weight of the oxide particle mixture (i), based on the synthetic resin, is reacted.

9. The process of claim 4, wherein the oxide particle mixture (i) has an (a):(b) weight ratio of from 1:10 to 5:1.

10. The process of claim 4, wherein the oxide particle mixture (i) consists of the microscale corundum (b).

11. The process of claim 4, wherein the oxide particle mixture (i) and at least one silane-based component are present in a weight ratio of from 100:1 to 0.5:1.

12. The process of claim 4, wherein the reaction is conducted in the presence of a catalyst.

13. The process of claim 4, wherein the reaction is conducted in the presence of water.

14. The process of claim 4, wherein the reaction is conducted in the presence of a wetting agent.

15. The process of claim 4, wherein the reaction is conducted at a temperature from 30 to 100° C.

16. The process of claim 4, wherein the curable synthetic resin or the curable synthetic resin precursor is introduced initially and heated, catalyst and water are added, at least one silane-based component is introduced, and then the oxide particle mixture (i) is added with thorough mixing.

17. The process of claim 16 further comprising, adding a wetting agent with the catalyst and water.

18. The process of claim 16, wherein from 0.5 to 6 mol of water per mole of silane-based component are present in the silane-based component.

19. The process of claim 4 wherein during or after reaction an alcohol is removed.

20. The process of claim 4, wherein the organofunctional silane (ii) is selected from the group consisting of 3-methacryloyloxypropyltrimethoxysilane, 3-methacryloyloxypropyltriethoxysilane, 3-methacryloyloxypropylmethyldimethoxysilane, 3-methacryloyloxypropylmethyldiethoxysilane, 3-methacryloyloxy-2-methylpropyltrimethoxysilane,
3-methacryloyloxy-2-methyl-propyltriethoxysilane,
vinyltrimethoxysilane, vinyltriethoxysilane,
vinylmethyldimethoxysilane, vinylmethyldiethoxysilane,
n-propyltrimethoxysilane, n-propyltriethoxysilane and mixtures thereof.

21. The process of claim 4, wherein the oxide particle mixture (i) comprises a nanoscale silica (a) and a microscale corundum ($\alpha$-$Al_2O_3$) (b).

22. A composition comprising a curable synthetic resin or a curable synthetic resin precursor obtained by the process of claim 4.

23. A process for producing a scratch and/or abrasion resistant coating comprising,
   coating a surface with the composition obtained by the method of claim 4.

24. A scratch and/or abrasion resistant coating obtained by the method of claim 23.

25. An article having a scratch resistant and/or abrasion resistant coating, said coating obtained by the process of claim 23.

26. A method of producing a scratch and abrasion resistant coating, which comprises
   applying the composition or the coating material obtained by the method of claim 4 to a substrate and subjecting the composition or the coating material to free-radical, thermal and/or photochemical curing.

27. A scratch and/or abrasion resistant coating obtained by the method of claim 26.

28. An article having a scratch resistant and/or abrasion resistant coating, said coating obtained by the process of claim 26.

29. An organosilicon nano/microhybrid system or microhybrid system obtained by reacting
   (i) an oxide particle mixture comprising (a) at least one nanoscale oxide and/or mixed oxide of at least one metal or semi-metal from main groups two to six or transition groups one to eight of the Periodic Table of the Elements, or of the lanthanides, and/or (b) a microscale corundum, with
   (ii) at least one organofunctional silane of formula II $$R^1_s R^2_r SiY_{(4-s-r)} \quad \text{(II)}$$

in which each of the groups $R^1$ and $R^2$ may be the same or different and each may be a linear, branched or cyclic alkyl croup of 1 to 50 carbon atoms, an alkenyl group of 2 to 6 carbon atoms or a chloroalkyl, isocyanoalkyl, cyanoalkyl, fluoroalkyl, aryl, acylalkyl, acryloyloxyalkyl, methacryloyloxyalkyl, polysulfanealkyl, mercaptoalkyl, thiacyamidoalkyl, glycidlyloxyalkyl, aminoalkyl, diaminoalkyl, triaminoalkyl, carbonatoalkyl or ureidoalkyl group, Y is a methoxy, ethoxy, isopropoxy, n-propoxy or 2-methoxy-ethoxy group, s is 1, 2 or 3, r is 0, 1 or 2, and (s+r) is $\leq 3$, in a liquid, curable synthetic resin or curable synthetic resin precursor.

30. The organosilicon nano/microhybrid or microhybrid system of claim 29 further comprising reacting (i) and/or (ii) with
   (iii) a monomeric and/or oligomeric silicic ester which carries methoxy, ethoxy, n-propoxy or isopropoxy groups and has an average degree of oligomerization of from 1 to 50.

31. The organosilicon nano/microhybrid or microhybrid system of claim 29 further comprising reacting (i) and/or (ii) with
   (iv) an organofunctional siloxane in which the functionalities may be the same or different and each silicon atom in the siloxane carries a functionality selected from the group consisting of alkyl, fluoroalkyl, cyanoalkyl, isocyanoalkyl, alkenyl, aminoalkyl, diaminoalkyl, triaminoalkyl, alkoxyalkyl, hydroxyalkyl, acylalkyl, glycidyloxyalkyl, acryloyloxyalkyl, methacryloyloxyalkyl, mercaptoalkyl, ureidoalkyl, aryl and alkoxy, and the remaining free valences of the silicon atoms in the siloxane are satisfied by methoxy, ethoxy or hydroxyl groups.

* * * * *